(12) United States Patent
Cisi

(10) Patent No.: US 9,591,228 B2
(45) Date of Patent: Mar. 7, 2017

(54) METHOD FOR THE LOCALIZATION OF A TOOL IN A WORKPLACE, CORRESPONDING SYSTEM AND COMPUTER PROGRAM PRODUCT

(71) Applicant: C.R.F. Societa Consortile per Azioni, Orbassano (IT)

(72) Inventor: Alessandro Cisi, Baldichieri d'Asti (IT)

(73) Assignee: C.R.F. Societá Consortile per Azioni, Orbassano (Turin) (IT)

( * ) Notice: Subject to any disclaimer, the term of this patent is extended or adjusted under 35 U.S.C. 154(b) by 434 days.

(21) Appl. No.: 14/335,264

(22) Filed: Jul. 18, 2014

(65) Prior Publication Data

US 2015/0035948 A1    Feb. 5, 2015

(30) Foreign Application Priority Data

Aug. 5, 2013  (EP) .................................... 13179271

(51) Int. Cl.
 *H04N 13/02*   (2006.01)
 *H04N 5/232*   (2006.01)
 *G05B 19/402*  (2006.01)

(52) U.S. Cl.
 CPC ....... *H04N 5/23296* (2013.01); *G05B 19/402* (2013.01); *H04N 13/0239* (2013.01)

(58) Field of Classification Search
 CPC ........... H04N 5/23296; H04N 13/0239; G05B 19/402
 USPC ......................................................... 348/47
 See application file for complete search history.

(56) References Cited

U.S. PATENT DOCUMENTS

| | | | |
|---|---|---|---|
| 5,506,682 A | 4/1996 | Pryor | |
| 2008/0051910 A1* | 2/2008 | Kammerzell | A61B 90/36 623/22.21 |
| 2008/0312866 A1* | 12/2008 | Shimomura | G01B 11/25 702/155 |
| 2011/0228050 A1* | 9/2011 | Wang | G05B 19/4015 348/46 |

OTHER PUBLICATIONS

European Search Report for corresponding European Application No. 13179271.5, dated Jan. 30, 2014 completed Jan. 24, 2014.

* cited by examiner

*Primary Examiner* — Allen Wong
(74) *Attorney, Agent, or Firm* — Heslin Rothenberg Farley & Mesiti P.C.; Victor A. Cardona, Esq.

(57) ABSTRACT

A method for locating a tool for industrial operations that is positioned in a sequence of operating points of an operating sequence associated to different positions on a component on which work is to be carried out, includes associating a light source to the tool and at least three light sources identifying a position reference triplet fixed with respect to the component. A stereovision apparatus having at least two video cameras acquires at least two respective images of the tool and component. The displacement of the operating points on the component is tracked when carrying out an industrial operation on the component by recognizing positions of the reference triplet and a point of the light source of the tool calculating the position of the operating points of an operating sequence with reference to the position assumed by the reference triplet and evaluating the position of the tool with respect to the calculated position of the operating points.

13 Claims, 8 Drawing Sheets

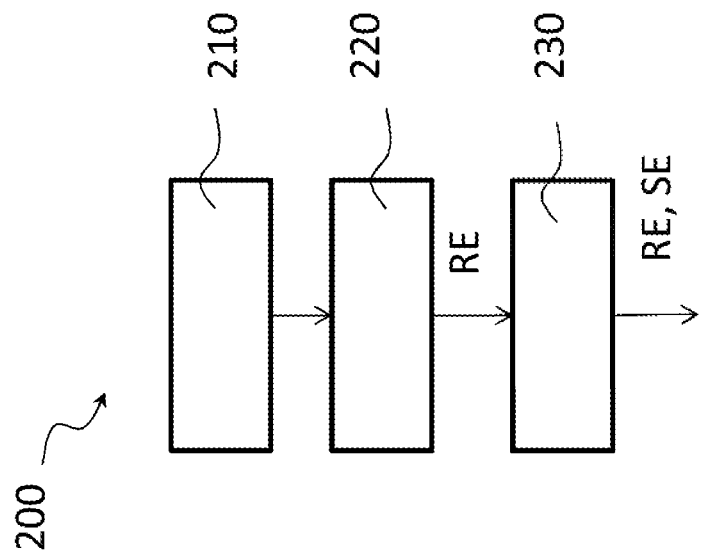
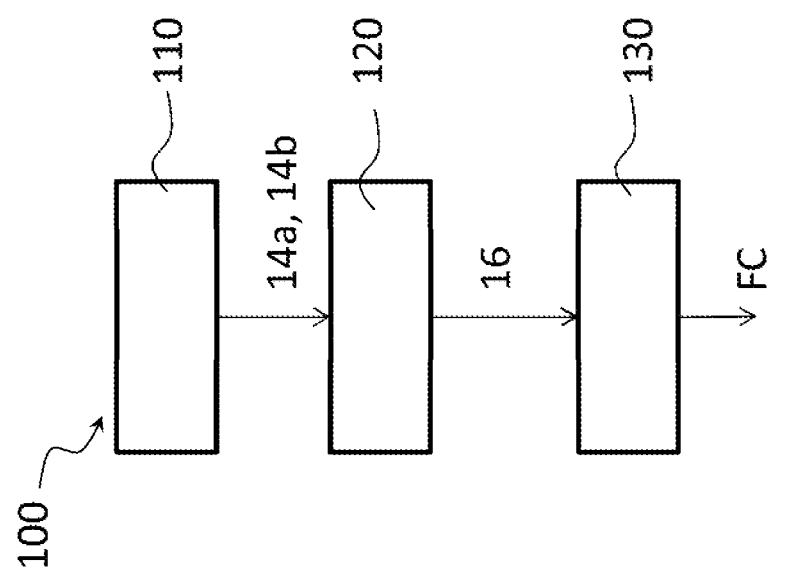

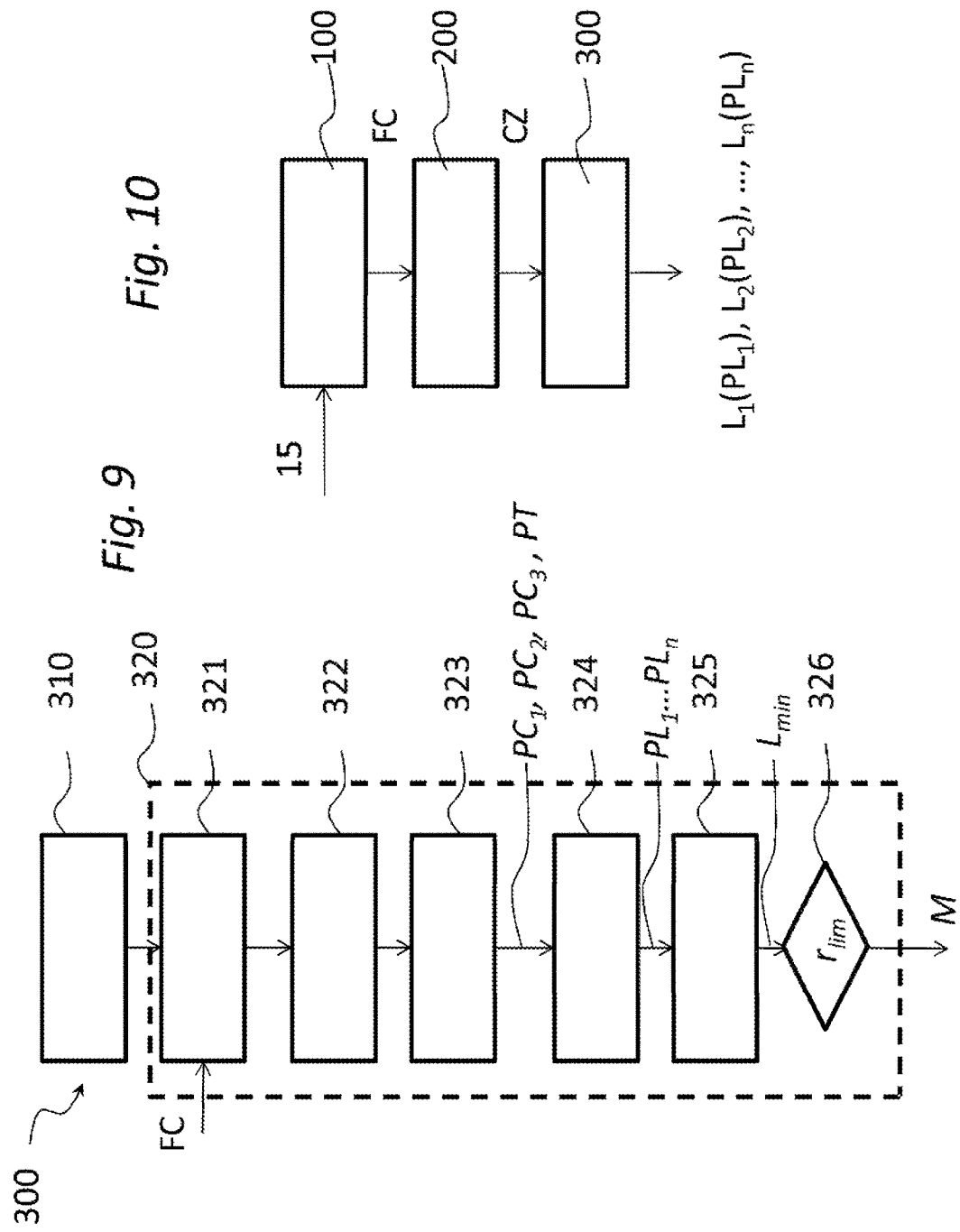

METHOD FOR THE LOCALIZATION OF A TOOL IN A WORKPLACE, CORRESPONDING SYSTEM AND COMPUTER PROGRAM PRODUCT

CROSS REFERENCE TO RELATED APPLICATIONS

This application claims priority from European Patent Application No. 13179271.5 filed on Aug. 5, 2013, the entire disclosure of which is incorporated herein by reference.

FIELD OF THE INVENTION

The present invention relates to techniques for locating a tool for industrial operations that is positioned in a sequence of operating points associated to different positions on a component on which work is to be carried out.

In what follows, understood by "tool" is an implement for carrying out industrial operations, for example a wrench or a welding yoke, which may possibly be associated to a manipulator robot, but this definition is understood as being extended also to elements for handling a tool, for example a flange of the robot to which an end effector can be secured.

PRIOR ART

In the process of assembly in the industrial field, there has assumed major importance the objectivization, namely the location of the position, in particular of a tool, with respect to a system, i.e., a triplet of reference axes, of an industrial operation, such as for example a screwing operation.

In this connection, it is important to understand, for example, how the screw is screwing in order to:
 inhibit screwing in the case where a particular sequence is envisaged and is not being respected; and
 preserving the data of torque and angle for the individual screwing operations (and not for a sequence of screwing operations).

Illustrated by way of example in FIG. 1 is a wrench 11 and a component 12 presenting a multiplicity of operating points $L_1 \ldots L_n$, i.e., of points in which there are screws to be screwed, located in different respective positions in space $PL_1 \ldots PL_n$.

The aim of location is hence on the one hand to understand where the component 12 is located, and hence the points $L_1 \ldots L_n$ to be screwed, and on the other to understand where the wrench 11 is located.

Technical Problem

There exist on the market systems, based upon ultrasound technology, which enable the above aims to be pursued, but normally present considerable limitations. In fact, these systems do not carry out location of the component, but rather record the co-ordinates in space with respect to the receivers irrespective of the presence/position of the component.

Consequently, they can be applied only in the condition where the component always reaches the same position. In the case of moving lines, the only solution is to read the encoder of the conveyor of the components and recalculate the position of the component.

OBJECT OF THE INVENTION

The object of the present invention is to propose a method of the type indicated at the start of the present description that will be able to solve the problems referred to above and to enable location of the component even when it is moving, without having to acquire information from the system for moving the component.

A further object of the invention is to provide a method that will be flexible and that will enable use of an economically advantageous system.

SUMMARY OF THE INVENTION

With a view to achieving the aforesaid objects, the subject of the invention is a locating method presenting the characteristics specified in Claim 1. A further subject of the invention is a locating system according to Claim 9 and a computer program product according to Claim 15. As used herein, reference to such a computer program product is understood as being equivalent to the reference to a computer-readable means containing instructions for control of the processing system in order to co-ordinate implementation of the method according to the invention. The reference to "at least one computer" is evidently understood as highlighting the possibility of the present invention being implemented in modular and/or distributed form.

BRIEF DESCRIPTION OF THE DRAWINGS

Further characteristics and advantages of the invention will emerge from the ensuing description with reference to the annexed drawings, which are provided purely by way of non-limiting example and in which:

FIG. 7 is an illustrative diagram of steps of a tracking procedure of the method according to the invention; and FIGS. 8-10 show flowcharts illustrating the locating method according to the invention.

DETAILED DESCRIPTION OF PREFERRED EMBODIMENTS OF THE INVENTION

In brief, the method and system proposed envisage locating the component undergoing an industrial operation by associating a reference comprising light sources fixed with respect to said component and a light source fixed with respect to the operating tool. On the basis of the position of the reference, evaluated via stereoscopic video cameras, i.e., video cameras to the images of which a stereovision procedure is applied on a computer, that identify the position thereof in space, the position of operating points on the component is calculated at each instant. Consequently, it is possible to locate the operating points on the component even though it is moving, with computing times compatible with the times of advance of the so-called "continuous moving" lines, where the component moves continuously with respect to the reference, and hence the position of the points to be reached varies in time as each of the points in the sequence is reached. Furthermore, advantageously the method guarantees six degrees of freedom of positioning for the component.

Figure 1:
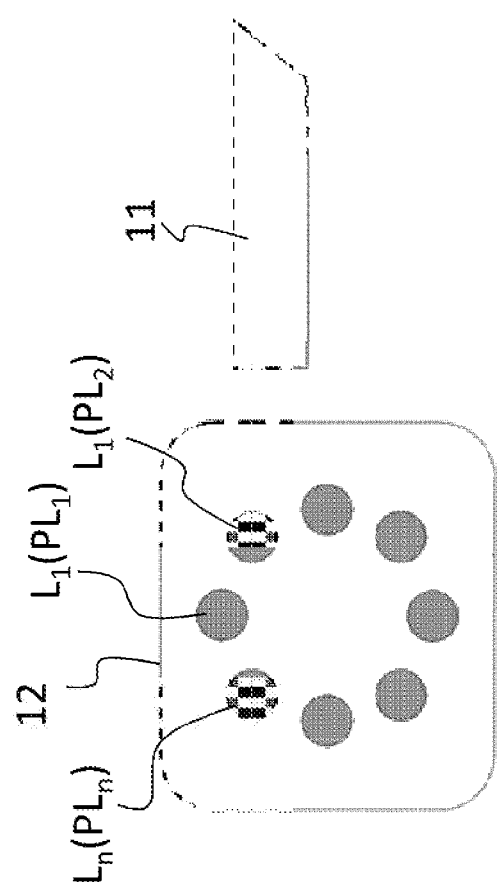
FIG. 1 has already been illustrated previously.
Figure 2:
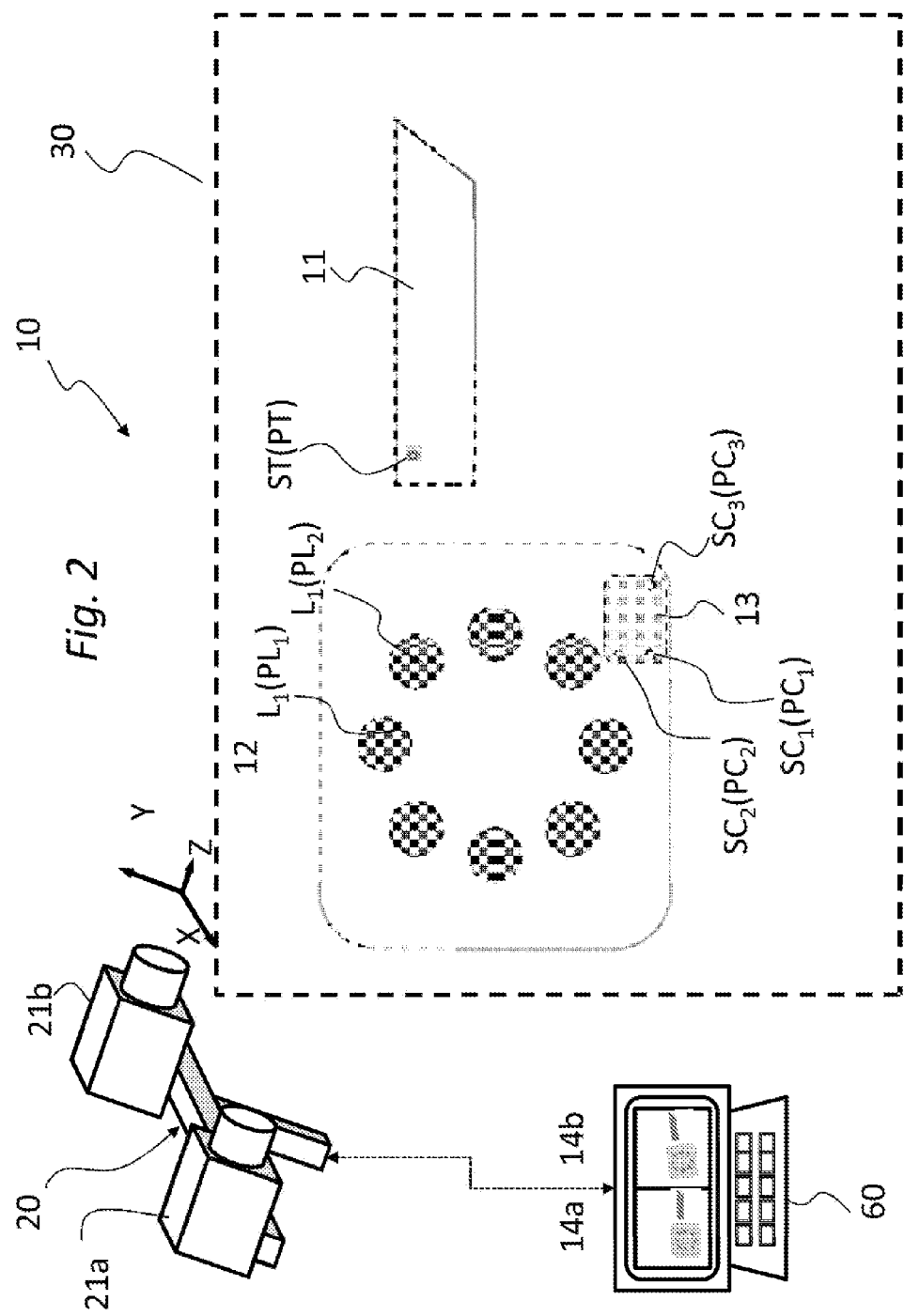
FIG. 2 is a schematic illustration of a system that implements the locating method according to the invention.

Illustrated in FIG. 2 is a system designed to implement the method according to the invention.

The above system, designated as a whole by the reference number 10, comprises a stereoscopic-vision apparatus 20, which comprises, in a way in itself known, a right-hand video camera 21a and a left-hand video camera 21b. These video cameras 21a and 21b film a working area 30, arranged in which are three light sources $SC_1$, $SC_2$, $SC_3$, in particular three infrared LEDs, in respective positions $PC_1$, $PC_2$, $PC_3$ and associated in a fixed way with respect to the component 12 to be tracked. In the example, these three light sources are arranged on a plate 13, which is in turn associated to the component 12. Also located in the working area 30 is the tool 11, namely, in the preferred example, a wrench, fixed with respect to which is a respective light source ST, which is also preferably an infrared LED, fixed thereto in a position PT that may, for example, be close to the operating tip, or tool tip.

In general, the system 10 of FIG. 2 is configured, via a respective control system 60, for example a personal computer, for controlling operation of the stereoscopic-vision apparatus 20 and acquiring the images filmed by the video cameras 21a and 21b of said apparatus 20. The control system 60 is in general configured for obtaining from the two images, the right-hand one 14a and the left-hand one 14b, acquired by the two video cameras 20a and 20b, respectively, via one of the known techniques of stereoscopic calculation, the position in space of the points of the scene filmed, i.e., for example the workspace 30.

The control system 60 is configured for executing, using the stereoscopic take, a procedure for locating the component 12, in particular for locating the operating points $L_1 \ldots L_n$, a general form of which is represented schematically in the flowchart of FIG. 10. This method hence in general comprises a procedure 100 of initialization of the system, which produces calibration files FC containing data that are a function of the positioning of the video cameras and enable in the first place a correction to be made in order to operate with the video cameras in a condition of epipolarity, a procedure 200 of characterization of the working environment, in which a characterization file CZ is built, which contains the position x, y, z of each of the three light sources $SC_1$, $SC_2$, $SC_3$ that identify a triplet of reference points RE and the position x, y, z of each operating point $L_1 \ldots L_n$, i.e., an operating sequence SE to be carried out. On the basis of the calibration file FC and of the characterization file CZ, obtained in the procedures 100 and 200, which in general are executed prior to the normal steps of the industrial operation, a tracking procedure 300 is executed. This tracking procedure in the first place tracks the positions $PL_1 \ldots PL_n$ of the operating points $L_1 \ldots L_n$ of the component 12 and of the tool 11; i.e., it calculates these positions $PL_1 \ldots PL_n$ continuously while the component 12 is moving. On the basis of these positions, the procedure 300 calculates also the point $L_{min}$ closest to the position PT of the tool 11. If the distance is less than a given threshold, the procedure 300 indicates that the tool 11 is located at an operating point $L_{min}$, and, for example, can carry out the operation, in particular screwing. As has been said, the method according to the invention in itself may be limited, during the industrial operation, to the tracking procedure 300, while the procedures 100 and 200 serve to set quantities used by the method and by the system according to the invention for location during the industrial operation.

Hence, in the framework of the method according to the invention, there is initially envisaged an initialization procedure 100, for initializing the stereovision apparatus 20.

The aforesaid procedure 100 envisages positioning the two video cameras 21a and 21b in such a way that they frame the working area 30 and then performing a calibration aimed at extracting the position of the video cameras 21a and 21b with respect to one another so as to correct the distortions of their optics and render the images of the two video cameras 21a and 21b epipolar, i.e., to proceed in such a way that, given the horizontal co-ordinate x and the vertical co-ordinate y, or height in the image, each point in a left-hand image 14b acquired by the left-hand video camera 21b is located at the same height y in the right-hand image 14a acquired by the right-hand video camera 21a.

Figure 3:
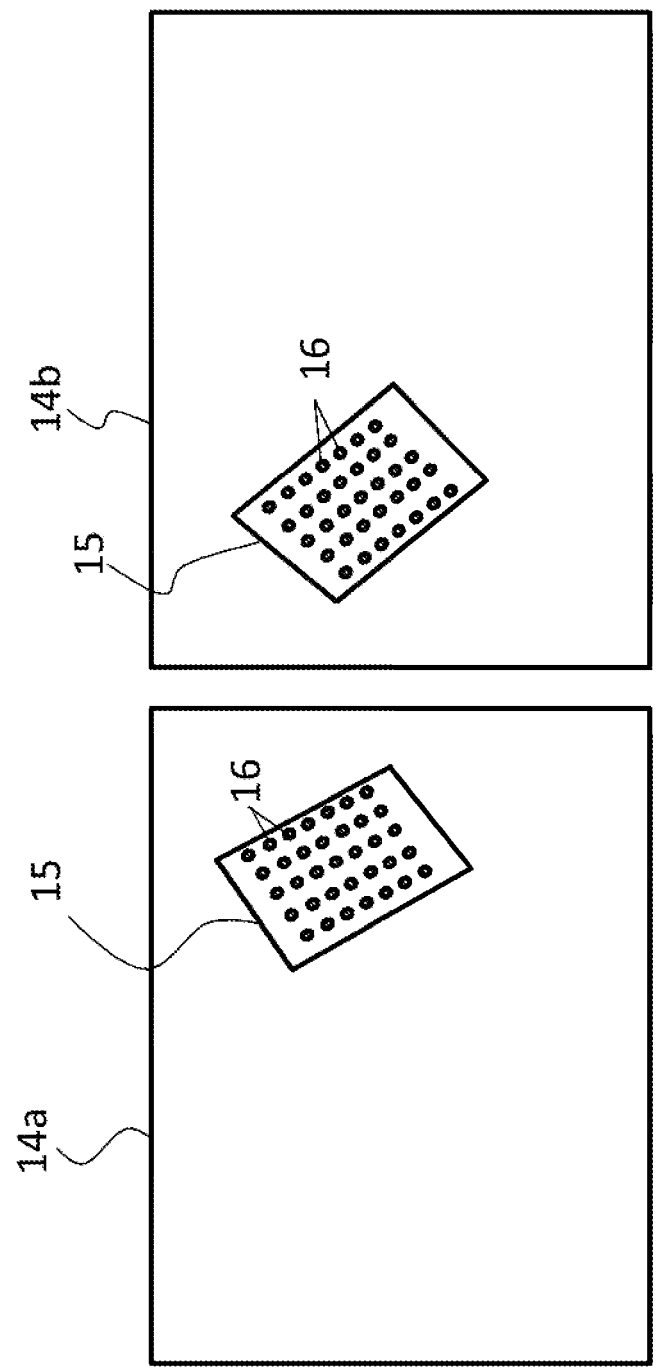
FIG. 3 is an illustrative diagram of an initialization procedure of the method according to the invention.

With reference to FIG. 3, which illustrates schematically a screenful of the control computer 60, configured, via a calibration software, for executing the procedure 100, displaying the right-hand and left-hand images 14a and 14b, there are here represented the two images directly acquired by the video cameras 21a and 21b, which frame a calibration instrument 15. This calibration instrument 15 is in general an object that comprises specific points or geometries, the disposition of which is known beforehand. In particular, the above calibration instrument 15 comprises a sheet, in particular of A3 UNI format, printed on which are thirty black circles 16 spaced at equal distances apart, the spacing between the circles being known.

With reference to the flowchart of FIG. 7, to carry out calibration first of all a step 110 is envisaged for acquisition of images of said video cameras, 21a and 21b, which frame the calibration instrument 15 presenting known geometries 16.

In a step 120, it is then envisaged to process the images 14a and 14b on the computer 60 in order to extract the co-ordinates of the known geometries, in particular in the example the co-ordinates on the camera plane of the centroids of the circles 16.

In particular, the computer 60 is configured, via the calibration software, for extracting the above co-ordinates automatically, carrying out the following operations:
  application of a filter such as to send to zero all the values of colour of pixels of the image below a certain threshold;
  search for the largest white object present in the image;
  search, within the white object, for the circular objects (namely, the circles);
  extraction of the centroids of the circles;
  identification of the corner circles in the instrument 15 and their ordering in a clockwise direction starting from a given corner (the circles 16 at the corners are coloured for this purpose red, white, yellow, orange); and
  ordering of the centroids of all the other circles (for example, blue), row by row, from red to white, up to the row from orange to yellow.

After the step 120 of extraction of the co-ordinates of the centroids of the circles 16 with respect to the images 14a and 14b of both of the cameras 21a and 21b, which are ordered in the same manner, and hence there is correspondence between the points or positions extracted on the right and on the left, these co-ordinates are used by a calibration step, which adopts techniques of calibration in themselves known in the field of stereovision and extracts calibration files FC, which contain data for carrying out epipolar rectification of the images 14a and 14b, as indicated, for example, at the URL https://sites.google.com/site/pubredi/computer-vision/stereo-view-geometry.

Since the results of the calibration are the better, the greater the number of pairs of images 14a, 14b acquired, in particular with the calibration instrument 15 in different positions, preferably in the procedure 1000 the images are acquired continuously (at approximately 20 fps) and processed in real time on 8 bits.

The calibration files FC are used in the subsequent procedures 200 and 300. By using these calibration files FC, as has been said, it is possible to apply a transformation to each pair of images 14a, 14b acquired such that the distortion of the optics is corrected and the condition of epipolarity achieved.

After correction of the images 14a, 14b carried out as described, a procedure of stereovision, in itself known, returns for each point belonging to both of the images 14a, 14b its position x, y, z in space; i.e., given the image co-ordinates of a point on the left-hand image 14b and those of the corresponding point on the right-hand image 14, the procedure of stereovision carries out triangulation of the position in space of the point. The reference system has its origin in the focus of one of the two cameras, has the axis X pointing towards the other focus, and the axis Z parallel to the axis of the camera.

There now follows a description of the procedure of characterization 200 of the working environment, which is carried out preferably with the system 10 installed in the workspace 30, for example following upon initialization (which may, on the other hand, be performed also in the workspace 30).

It is envisaged, in a step 210, to configure the optics of the video cameras 21a and 21b, for detecting only the wavelength of the light sources on the component $SC_1$, $SC_2$, $SC_3$ and on the tool ST. If infrared LEDs are used as sources, the video cameras can have optics sensitive to infrared, or there may be mounted for this procedure 200 and for the subsequent procedure 300, on the optics of the video cameras 21a and 21b, bandpass filters such that only the wavelength of the light sources on the component $SC_1$, $SC_2$, $SC_3$ and on the wrench ST are visible.

This is followed by a step 220 of definition of the triplet RE of sources $SC_1$, $SC_2$, $SC_3$ fixed with respect to the component 12, which, whether they are mounted or not on the plate 13, they can be mounted directly on the component 12 or on a pallet or support that conveys the pallet.

Figure 4:
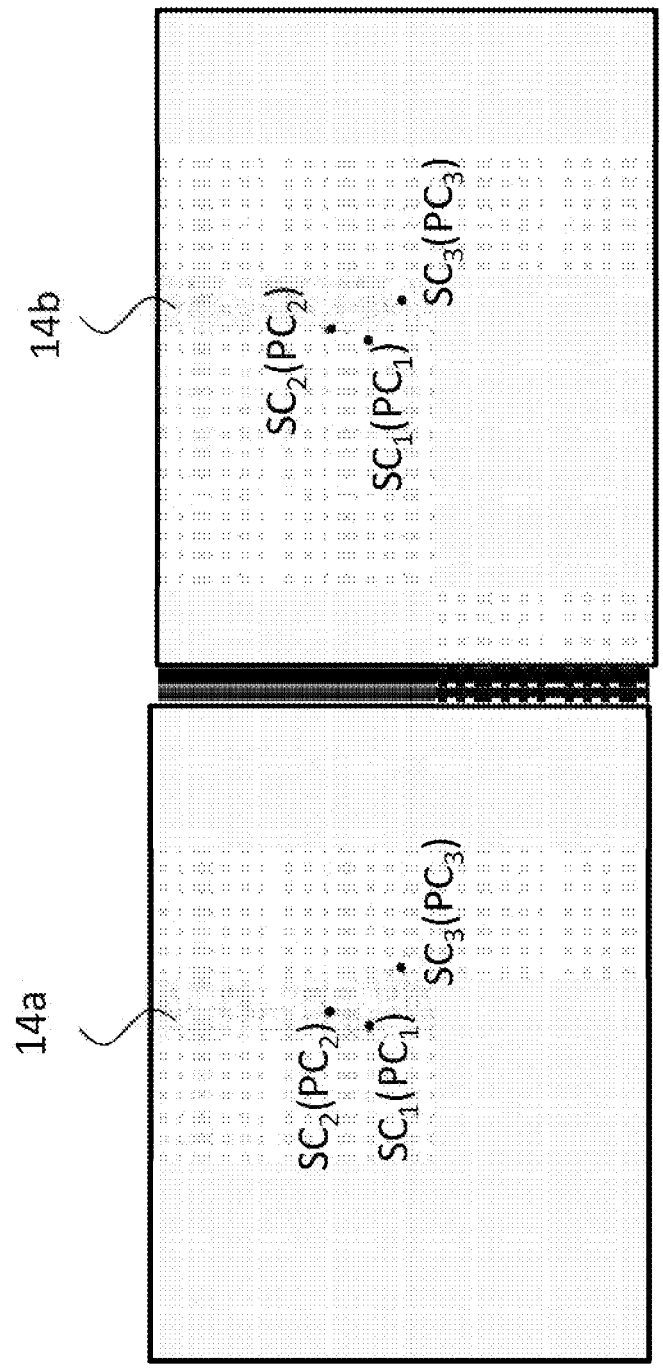
FIG. 4 is an illustrative diagram of a characterization procedure of the method according to the invention.

With reference to FIG. 4, which is a schematic illustration of a screen of the control computer 60, which is configured, in step 220, via a characterization software, for executing the procedure 200, displaying the right-hand and left-hand images 14a and 14b, and for identifying the three positions $PC_1$, $PC_2$ $PC_3$ corresponding to the light sources $SC_1$, $SC_2$, $SC_3$. These positions are identified and ordered automatically by the system 10 using, in particular, an algorithm for searching for the objects that extracts the centroids thereof. Distances $r_1$, $r_2$, $r_3$ between the positions $PC_1$, $PC_2$, $PC_3$ are likewise calculated, once again in step 220, directly by the software by applying the aforementioned stereovision routine, which supplies the position co-ordinates x, y, z of the three positions $PC_1$, $PC_2$, $PC_3$.

The system 10 is then configured for storing, for example in its own storage means, said triplet of positions $PC_1$, $PC_2$, $PC_3$ and corresponding distances $r_1$, $r_2$, $r_3$ as reference RE of the system 10.

Then there is envisaged an operation 230 of storage of the operating sequence SE to be executed, i.e., the operating points $L_1 \ldots L_n$, and the order in which they are to be reached (operating path, in particular, for the screwing operation).

Figure 5:
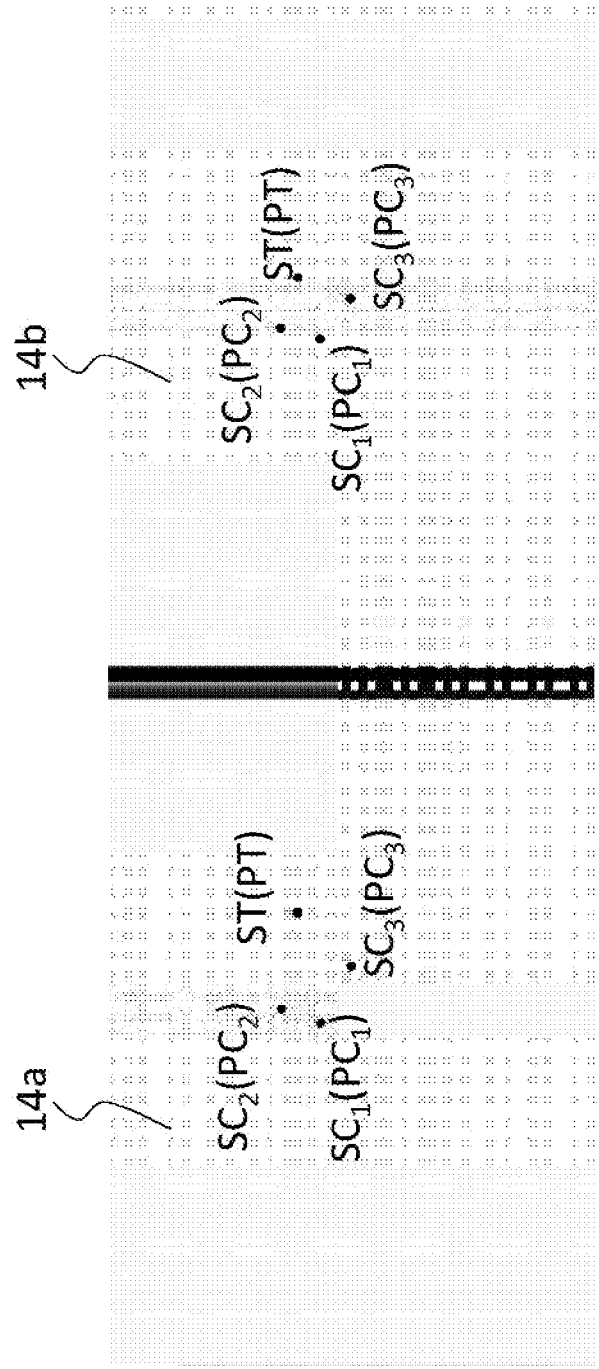
FIG. 5 is an illustrative diagram of steps of a tracking procedure of the method according to the invention.

In FIG. 5 there may be noted, as regards the operation 230, a further, fourth, light point corresponding to the light source ST of the tool 12, which is associated a position of the tool PT (the light source ST is positioned, in the example, in axis with the spindle). Preferably, during the operation 220 in which the reference triplet is recognized, the tool is not present. During the operation 230 in which the path is recorded, the tool is present.

As the tool 12 is displaced on the various operating points $L_1 \ldots L_n$, the system 10, identifying the position PT assumed each time by the light source ST, stores, in a characterization file CZ, the positions $PL_1 \ldots PL_n$ thereof, which define the operating sequence SE to be executed. In other words, this is a learning procedure in which, for example an operating sequence is executed in the order envisaged and the positions are recorded.

The characterization file CZ stored contains the position x, y, z of each of the three reference points $PC_1$, $PC_2$, $PC_3$ and the position x, y, z of each point of screwing (preferably in the correct order envisaged by the operating sequence).

Identification of the points, i.e., of the positions, corresponding to the light sources, or rather the correspondence between a point of the left-hand image 14b with a point of the right-hand image 14a, may be subject to errors. To render this identification robust, it is for example envisaged to use a combinational algorithm, which operates as follows:

each point of the left-hand image 14b is coupled with each point of the right-hand image 14a that has a similar height y (the axis y identifies the rows of the image); by "similar" is meant a difference in height that falls within a few pixels, for example +/−3 pixels; in fact, since the images are rendered epipolar, to each point there corresponds in both images practically the same height y;

for each pair of points in the two images 14a and 14b the stereovision-calculation procedure is applied, extracting the co-ordinates x, y, z of the hypothetical point; from this calculation procedure there are in general obtained more than four three-dimensional points;

given the first point, the distance thereof from all the other points is calculated; if one of the distances acquired is quite similar (for example, within a threshold value) to one of the distances $r_1$, $r_2$, $r_3$ envisaged for the reference triplet RE, the pair of points is temporarily stored; the distance of this pair from the other potential points is calculated and, if the third point of the triplet RE is found, the procedure is interrupted; the procedure continues until the triplet RE of positions $PC_1$, $PC_2$, $PC_3$ is identified;

the point in the starting images of FIG. 5 that does not form part of the reference triplet RE is consequently the fourth point, namely, the position PT of the source ST of the tool 11.

Of course, a necessary condition is that in the images there should be four and only four points, which is what optical filtering aims to obtain.

Any different condition is not accepted.

Figure 6:
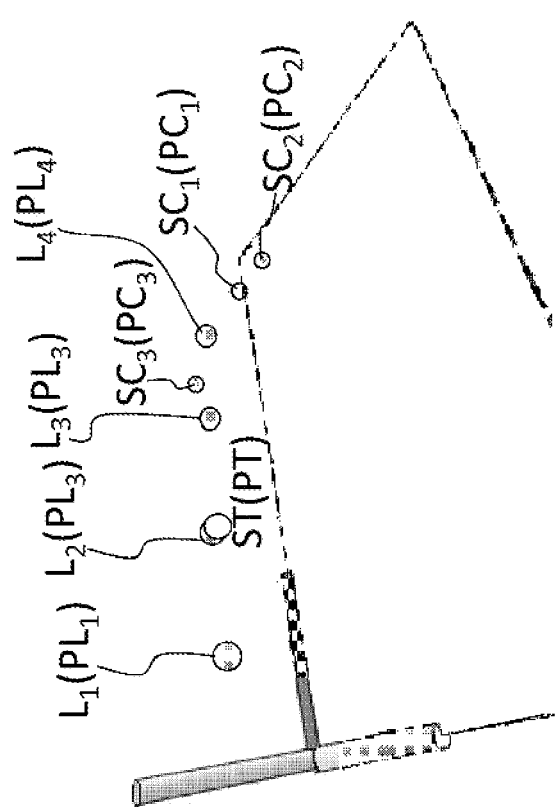
FIG. 6 is an illustrative diagram of further steps of a tracking procedure of the method according to the invention.

FIG. 6 illustrates a screenful of the computer of the system in the tracking step, which, as has been said, is implemented when the industrial operation is normally being carried out on the components 12 via the tool 11.

Also in this case, the right-hand and left-hand images, 14a and 14b, are acquired by the video cameras 21a and 21b continuously on 8 bits and processed in real time (the processing time guarantees, for example, approximately 20 fps). At each frame the system 10 carries out the following operations:

epipolar rectification 321 of the right-hand 14a and left-hand 14b images via the correction files FC;

extraction 322 of the positions in space of the points from the right-hand image 14a and the left-hand image 14b, using the stereoscopic-calculation procedure;

recognition 323 of the points and of the corresponding positions $PC_1$, $PC_2$, $PC_3$ of the reference triplet RE, i.e., of reference sources $SC_1$, $SC_2$, $SC_3$ on the component 12 and of the point PT of the tool 11, i.e., of the wrench, via triangulation of the position in space according to the stereovision procedures;

recalculation 324 of the positions $PL_1$ ... $PL_n$ of the operating sequence SE with reference to the positions $PC_1$, $PC_2$, $PC_3$ assumed by the reference triplet RE; since the component 11 and the reference triplet RE are fixed with respect to one another, once the positions $PC_1$, $PC_2$, $PC_3$ of the reference triplet RE are known, it is possible to derive the position of any other point; the recalculation step 324 is carried out, for example, for each frame that is received subsequently during the period of execution of the tracking procedure 300, in which period of execution the component 12 and the operating points $L_1$ ... $L_n$ move in the workspace 30 taken by the video cameras;

calculation 325 of an operating point $L_{min}$ in the operating sequence SE the position $PL_{min}$ of which is the one closest to the position PT of the tool 12;

in a step of identification of the position with respect to the operating points 326, if the closest operating point $L_{min}$ is at a distance shorter than a limit distance $r_{lim}$ that can be set (typically, for a screwing operation, 15 mm), the system 10 considers the tool 12 as being set in a position corresponding to the required operating point and generates a positive identification signal M, for example lights up a corresponding lamp or yields in any case a positive feedback, or an ON state.

The operations 325 and 326 form part of a possible operation for locating the position of the tool with respect to the positions $PL_1$ ... $PL_n$ of the operating sequence SE.

Of course, once the position of the tool 11 with respect to the points of the sequence SE is identified, the information can be managed according to the result that it is intended to obtain and the application. For instance, when the position PT of the wrench 11 corresponds to an operating point $L_i$, it is possible to govern screwing of the corresponding screw. Otherwise, it is possible to inhibit the operation, in particular the screwing operation, in the case where a particular sequence is envisaged and is not being respected, or else again it is possible to store parameters of the operation, for example preserving the data of torque and angle for the individual screwing operations (and not for a sequence of screwing operations).

There now follows a detailed description of how the step 324 of recalculation of the positions $PL_1$ ... $PL_n$ of the operating points $L_1$ ... $L_n$ of the operating sequence SE is carried out, once the position of the reference triplet RE fixed with respect to the component 12 is known. As has been mentioned, in the step of storage 230 of the sequence a characterization file CZ is saved, containing the position in space, x, y, z of each of the three reference points $PC_1$, $PC_2$, $PC_3$ and the position x, y, z of each operating point $L_1$ ... $L_n$ (preferably in the correct order envisaged by the operating sequence).

In practice, given that the initial position of the reference triplet RE of sources $SC_1$, $SC_2$, $SC_3$ is known from the recording step 230 and the final position of the reference triplet RE of sources $SC_1$, $SC_2$, $SC_3$ is known from the tracking procedure 300, in particular from the recognition step 323, this information is used to understand how the component 12 has moved in space. Once the displacement has been obtained, it is then applied to the points of the operating sequence.

Hence, as regards the made of calculation of the above displacement, namely, a rototranslation in space, it is in general known that any isometry in space can be expressed by the following system $$\begin{cases} x' = a_1 x + b_1 y + c_1 z + d_1 \\ y' = a_2 x + b_2 y + c_2 z + d_2 \\ z' = a_3 x + b_3 y + c_3 z + d_3 \end{cases}$$

which in matrix form becomes $$\begin{bmatrix} x' \\ y' \\ z' \\ 1 \end{bmatrix} = \begin{bmatrix} a_1 & b_1 & c_1 & d_1 \\ a_2 & b_2 & c_2 & d_2 \\ a_3 & b_3 & c_3 & d_3 \\ 0 & 0 & 0 & 1 \end{bmatrix} \cdot \begin{bmatrix} x \\ y \\ z \\ 1 \end{bmatrix}$$

where the 3×3 submatrix in a, b, c is an orthogonal matrix, in the case in point a rotation matrix. The 3×1 subvector in the variable d represents the translation, and the 1×4 subvector (last row) is constant. In compact form we have $$P'^{4\times 1} = R^{4\times 4} \cdot P^{4\times 1}$$

where $P'^{4\times 1}$ is the vector of the co-ordinates in the arrival system, $P^{4\times 1}$ is the vector of the co-ordinates in the starting system, and $R^{4\times 4}$ is the rototranslation matrix.

To make the transformation referred to above it would be necessary to know the angles of rotation about the axes (Euler angles) and the translation vector.

The method according to the invention envisages, instead, backward calculation of the rototranslation matrix R, given, for respective four points $P_1$, $P_2$, $P_3$, $P_4$, the initial position and the final position, i.e., respectively, the position stored in the recording step 230 and the position obtained from step 323 during tracking 300.

In matrix form we thus have $$\begin{bmatrix} x'_1 & x'_2 & x'_3 & x'_4 \\ y'_1 & y'_2 & y'_3 & y'_4 \\ z'_1 & z'_2 & z'_3 & z'_4 \\ 1 & 1 & 1 & 1 \end{bmatrix} = \begin{bmatrix} a_1 & b_1 & c_1 & d_1 \\ a_2 & b_2 & c_2 & d_2 \\ a_3 & b_3 & c_3 & d_3 \\ 0 & 0 & 0 & 1 \end{bmatrix} \cdot \begin{bmatrix} x_1 & x_2 & x_3 & x_4 \\ y_1 & y_2 & y_3 & y_4 \\ z_1 & z_2 & z_3 & z_4 \\ 1 & 1 & 1 & 1 \end{bmatrix}$$

or in compact form $$P'^{4\times 4} = R^{4\times 4} \cdot P^{4\times 4}$$

The above rototranslation matrix R must be obtained by inverting the matrix P of the positions of the points in the arrival reference system (step 323) as follows (the dimension of the matrix is omitted)

$$R = P' \cdot P^{-1}$$

It is thus evident why four points are needed; otherwise, the matrix P of the positions of the points in the arrival reference system would not be invertible. Since in the case in question in actual fact only three points are available, because there are three light sources of the reference triplet, the fourth point $P_4$ must be obtained by combining the previous three fixed points $P_1$, $P_2$, $P_3$. It should be emphasized that the fourth point $P_4$ cannot be a linear combination of the other three; i.e., it cannot lie in the same plane; in other words, the matrix P is not invertible.

The operation of extraction of the fourth point $P_4$ via combination is obtained by applying, for example, the following criteria:
- the point $P_4$ lies on a straight line perpendicular to the plane passing through the three fixed points $P_1$, $P_2$, $P_3$;
- the point $P_4$ passes through a midpoint $P_m$ of the three fixed points $P_1$, $P_2$, $P_3$;
- the point $P_4$ is set at a distance from the midpoint $P_m$ equal to the mean distance between the three fixed points $P_1$, $P_2$, $P_3$.

Specifically, to identify the fourth point $P_4$, the first step is to calculate the equation of the plane $\pi$ passing through the three fixed points, namely $$\pi: ax+by+cz+d=0$$

This cartesian equation is obtained by developing the determinant of the matrix $$\begin{vmatrix} x-x_1 & y-y_1 & z-z_1 \\ x_2-x_1 & y_2-y_1 & z_2-z_1 \\ x_3-x_1 & y_3-y_1 & z_3-z_1 \end{vmatrix} = 0$$

i.e., by calculating the subderminants thereof $$a_D = \begin{vmatrix} y_2-y_1 & z_2-z_1 \\ y_3-y_1 & z_3-z_1 \end{vmatrix}$$

$$b_D = -\begin{vmatrix} x_2-x_1 & z_2-z_1 \\ x_3-x_1 & z_3-z_1 \end{vmatrix}$$

$$c_D = \begin{vmatrix} x_2-x_1 & y_2-y_1 \\ x_3-x_1 & y_3-y_1 \end{vmatrix}$$

$$d_D = -(ax_1 + by_1 + cz_1)$$

This having been done, a value of the midpoint $P_m$ between the three fixed points $P_1$, $P_2$, $P_3$ is calculated. The parametric equation of the straight line perpendicular to the plane $\pi$ and passing through said midpoint $P_m$ is $$\begin{cases} x = x_m + a_D t \\ y = y_m + b_D t \\ z = z_m + c_D t \end{cases}$$

This having been done, setting $P_4$ as the unknown point, the value of the parameter t is found such that the distance of the unknown point from the midpoint is equal to a distance dist, where dist is equal to the mean distance between the three fixed points, which are known $$\text{dist} = \sqrt{(x_4 - x_m)^2 + (y_4 - y_m)^2 + (z_4 - z_m)^2}$$

i.e., $$\text{dist} = \sqrt{(a_D t)^2 + (b_D t)^2 + (ct)^2}$$

whence $$t = \frac{\text{dist}}{\sqrt{a_D^2 + b_D^2 + c_D^2}}$$

At this point, substituting t in the parametric equation of the straight line, the fourth point $P_4$ is found.

To sum up, then, for the case in question, we shall find that the rototranslation matrix $R^{(4 \times 4)}$ enables passage from one reference system to another. If we designate by P the points that belong to the old reference system (the reference triplet in the step of recording of the sequence of operating points) and by P' the points that belong to the new reference system (the triplet recognized in the tracking step 300), the matrix R is calculated by multiplying P' by the inverse of P:

$$P' = R \cdot P \rightarrow R = P' \cdot P^{-1}$$

At this point, the rototranslation matrix R is applied to the points of the operating sequence passing from the old position, i.e., the position of the points of screwing stored in the recording step 230, to the new position (the one associated to the recognition step 323 in the tracking step 300).

Hence, the advantages of the method according to the invention emerge clearly.

The method according to the invention advantageously yields the position of the tool with respect to the operating points of a generic component for continuous moving lines where the component moves continuously with respect to the reference; thus the position of the points to be reached varies over time as each of the points in the sequence is reached.

Advantageously, the method according to the invention, in fact, can be implemented at a high computing speed that enables adaptation to continuous-moving applications.

This is obtained advantageously in an inexpensive way in so far as the system only requires two video cameras possibly equipped with optical filters and four light sources, in particular, four LEDs, in addition to a computer to carry out control of the system and processing of the images acquired.

Advantageously, the method according to the invention proves very flexible as regards installation in so far as the video cameras can be set in any position without any reference. In fact, the calibration procedure calculates the mutual position of the video cameras. To vary the area framed it is sufficient to change the optics.

Advantageously, the method according to the invention achieves a high precision of the system that depends upon the area framed: the narrower this is, the more the precision increases. Increase in the resolution of the cameras is also possible even though at the expense of the speed of the system.

The system that implements the method is advantageously only sensitive to occluding objects that were to hide one of the four light sources. On the other hand, using a larger number of video cameras it is possible to reduce the effect of this drawback. Instead, the system is insensitive to temperature and electromagnetic waves.

It is possible to work with a number of systems of components and tools simultaneously, varying for each one the wavelength of the light sources (for example, in the range of the visible and the near infrared) that is to be considered valid.

Of course, without prejudice to the principle of the invention, the details of construction and the embodiments may vary widely with respect to what has been described purely by way of example herein, without thereby departing from the scope of the ensuing claims.

The system that implements the method according to the invention can be used in different applications in which it is necessary to know the position of a tool in a workspace.

The light source can thus be mounted on a wrench, as described, or a welding yoke or any other tool that has to work on a component in a sequence of operating points.

The method according to the invention may be implemented using one or more computers, or microprocessor cards or microcontrollers. In particular, just one control module may be provided, on a card or microprocessor, which implements the procedure of calculation of the position and control of the stereovision system.

In addition to operating in continuous-moving mode, the method and system may be applied also in the following modes:

static mode, where the component is fixed with respect to the reference so that the points to be reached are always located in the same position with respect to the outside world;

Stop&Go mode, where the component may be located in any position with respect to the reference but, once it has been positioned, it no longer moves before its operating sequence has been concluded.

What is claimed is:

1. A method for locating a tool for industrial operations that is positioned in a sequence of operating points of an operating sequence associated to different positions on a component on which work is to be carried out, comprising:
    associating a light source to said tool and at least three light sources identifying a position reference triplet fixed with respect to said component,
    acquiring, via a stereovision apparatus comprising at least two video cameras, at least two respective images of said tool and component;
    tracking a displacement of said operating points on said component, when an industrial operation is being carried out on the component, by:
        recognizing positions of the reference triplet and a point of the light source of the tool;
        calculating the position of the operating points of an operating sequence with reference to the position assumed by the reference triplet; and
        evaluating the position of the tool with respect to the calculated position of the operating points.

2. The method according to claim 1, further comprising, following upon calculation of the position of the operating points of an operating sequence with reference to the position assumed by the reference triplet, calculating an operating point in the operating sequence closest to the point of the tool and evaluating whether said closest operating point is at a distance less than a limit distance that can be set from the position associated to the source of the tool, and if so, of emitting a signal of correspondence that indicates that the tool is at the required operating point.

3. The method according to claim 1, further comprising, prior to said tracking operation, an initialization procedure, for initializing the stereovision apparatus, the initialization procedure comprising:
    acquiring images of said video cameras that frame a calibration instrument presenting known geometries;
    extracting co-ordinates of said known geometries; and
    supplying said co-ordinates to a calibration procedure that calculates, on the basis of the position of the video cameras with respect to one another, correction values in order to render the images of the two video cameras epipolar.

4. The method according to claim 1, further comprising a procedure of characterization of the working environment comprising:
    configuring the optics of the video cameras, via filtering, for detecting only the wavelength of the light sources on the component and on the tool;
    defining the positions of the reference triplet fixed with respect to the component and distances between said positions; and
    storing said positions and distances as reference values for the tracking procedure.

5. The method according to claim 4, wherein said procedure of characterization of the working environment further comprises recording the positions of the operating sequence, displacing the tool at operating points and recording the successive positions of the tool as positions of the operating sequence.

6. The method according to claim 5, further comprising recording in a characterization file the position in space of each of the three reference points, and the position in space of each operating point.

7. The method according to claim 5, wherein said operation of calculating the position of the operating points of an operating sequence with reference to the position assumed by the reference triplet comprises performing a rototranslation of recorded working positions into working positions calculated during tracking, a corresponding rototranslation matrix being obtained on the basis of a matrix comprising the positions of the reference triplet during the recording operation and of a matrix comprising the positions of the reference triplet obtained during the operation of recognition.

8. The method according to claim 4, wherein said operation of defining the positions of the reference triplet fixed with respect to the component and distances between said positions comprises the following steps:
    coupling each point of one of the two images with each point of the other image that has a similar height;
    for each pair of points in the two images calculating via the stereovision-calculation procedure the co-ordinates of a hypothetical point;
    given the first hypothetical point, calculating its distance from the other hypothetical points;
    if said distance is similar to one of the distances of the reference triplet, temporarily storing the corresponding pair of points;
    repeating said calculation of the distance for the other hypothetical points and, when the third point of the reference triplet is found, interrupting the calculation.

9. The method according to claim 1, wherein said operations of the tracking procedure are executed in real time with continuous acquisition of the images.

10. A system for locating a tool for industrial operations that is positioned in a sequence of operating points of an operating sequence associated to different positions on a component on which work is to be carried out, comprising:
    a light source associated to said tool and at least three light sources, identifying a position reference triplet fixedly associated to said component, a stereovision apparatus comprising at least two video cameras, and a control module configured for controlling said stereovision apparatus and acquiring images of said video cameras, said control module being configured for tracking the displacement of said operating points on said component according to the method according to claim 1.

11. The system according to claim 10, wherein said light sources are infrared emitting LED's.

12. The system according to claim 10, wherein said tool is a wrench and said operating points are screwing points.

13. A computer program product that can be directly loaded into the memory of at least one computer and comprises portions of software code for implementing the method according to claim 1.

* * * * *